(12) United States Patent
Chalmers et al.

(10) Patent No.: US 9,866,348 B2
(45) Date of Patent: Jan. 9, 2018

(54) VEHICLE WIRELESS DEVICE DETECTION AND SHIELDING

(71) Applicant: Distracted Driving Holding Company, LLC, Ridgeland, MS (US)

(72) Inventors: Jeremy Chalmers, Philadelphia, MS (US); Keith Morgan, Madison, MS (US); Stephen Stewart, Jackson, MS (US); Robert Burchett, Torrance, CA (US)

(73) Assignee: Distracted Driving Holding Company, Ridgeland, MS (US)

( * ) Notice: Subject to any disclaimer, the term of this patent is extended or adjusted under 35 U.S.C. 154(b) by 203 days.

(21) Appl. No.: 14/745,148

(22) Filed: Jun. 19, 2015

(65) Prior Publication Data
US 2015/0288482 A1  Oct. 8, 2015

Related U.S. Application Data

(63) Continuation of application No. 13/776,255, filed on Feb. 25, 2013, now abandoned.
(Continued)

(51) Int. Cl.
*H04K 3/00* (2006.01)
*H04W 4/02* (2009.01)
(Continued)

(52) U.S. Cl.
CPC ............. *H04K 3/415* (2013.01); *B60C 9/00* (2013.01); *H04K 3/68* (2013.01); *H04W 4/027* (2013.01);
(Continued)

(58) Field of Classification Search
CPC ......... G01S 19/13; H04W 4/027; H04W 4/04; H04W 4/14; H04W 24/08; H04W 4/046; H04W 4/021; H04W 48/04; H04W 4/001; H04W 4/02; H04W 4/022; H04W 4/023; H04W 4/025; H04W 88/02; H04K 2203/16; H04K 2203/22; H04K 3/415; H04K 3/68; H04K 3/45; B60Q 9/00; B60R 21/0153; B60R 21/01532; B60R 21/01534; B60R 21/0156; B60R 21/01542; H04M 1/6075;
(Continued)

(56) References Cited

U.S. PATENT DOCUMENTS 8,461,973 B2    6/2013   Reed et al.
2004/0215382 A1 10/2004  Breed et al.
(Continued)

*Primary Examiner* — Erica Navar
(74) *Attorney, Agent, or Firm* — Fish IP Law, LLP

(57) ABSTRACT

The disclosure includes an apparatus comprising a diagnostic unit configured to communicate with a rules engine to determine whether a transmission detected in a vehicle is classified as driver wireless device usage based on passenger data indicating whether a passenger is present in the vehicle. The disclosure also includes a system comprising a shielding unit configured to transmit a noise signal to interrupt a transmission detected in a vehicle, and a diagnostic unit configured to communicate with a rules engine to determine whether the detected transmission is classified as driver wireless device usage based on the passenger data indicating whether a passenger is present in the vehicle, and engage the shielding unit if the transmission is classified as driver wireless device usage.

34 Claims, 5 Drawing Sheets

Related U.S. Application Data

(60) Provisional application No. 61/692,467, filed on Aug. 23, 2012, provisional application No. 61/602,722, filed on Feb. 24, 2012.

(51) Int. Cl.
  *H04W 24/08* (2009.01)
  *B60Q 9/00* (2006.01)
  *H04W 4/14* (2009.01)
  *H04W 4/04* (2009.01)
  *B60C 9/00* (2006.01)

(52) U.S. Cl.
  CPC ............... *H04W 4/04* (2013.01); *H04W 4/14* (2013.01); *H04W 24/08* (2013.01); *H04K 2203/16* (2013.01); *H04K 2203/22* (2013.01)

(58) Field of Classification Search
  CPC ......... H04M 1/72577; H04M 2250/10; H04M 1/6091; H04M 1/66; H04M 1/67; H04M 1/72538; H04M 1/72572; H04M 2250/02; H04M 2250/12; H04M 3/436; H04M 19/044; H04M 1/72536; H04M 1/72552; H04M 1/07; H04M 2201/18; H04M 2207/18; H04M 2242/14; H04M 2242/30; H04M 3/38; H04M 3/42348; H04M 3/53; H04M 3/54
  USPC .......................................... 455/1, 425, 456.1
  See application file for complete search history.

(56) References Cited

U.S. PATENT DOCUMENTS

| | | |
|---|---|---|
| 2007/0072616 A1 | 3/2007 | Irani |
| 2007/0281603 A1 | 12/2007 | Nath et al. |
| 2009/0253423 A1 | 10/2009 | Kullberg |
| 2010/0148920 A1 | 6/2010 | Philmon et al. |
| 2010/0210254 A1 | 8/2010 | Kelly et al. |
| 2010/0309951 A1* | 12/2010 | Dowla ............... H04K 3/42 375/130 |
| 2011/0009107 A1 | 1/2011 | Guba et al. |
| 2011/0105097 A1 | 5/2011 | Tadayon et al. |
| 2011/0195699 A1* | 8/2011 | Tadayon ............. H04B 5/0062 455/418 |
| 2012/0006611 A1* | 1/2012 | Wallace ............... H04M 1/67 180/272 |
| 2012/0231773 A1 | 9/2012 | Lipovski |

* cited by examiner

VEHICLE WIRELESS DEVICE DETECTION AND SHIELDING

The present application a continuation of U.S. patent application Ser. No. 13/776,255, filed Feb. 25, 2013 and claims priority to U.S. Provisional Patent Application 61/602,722, filed Feb. 24, 2012 and U.S. Provisional Patent Application 61/692,467, filed Aug. 23, 2012 both of which are incorporated herein by reference as if reproduced in their entirety.

BACKGROUND

Use of wireless devices while driving is a major cause of accidents in the United States. Wireless devices may comprise a broad category of devices such as cellular phones, smart phones, laptop personal computers (PCs), tablet PCs, portable game systems, electronic book readers, etc. Employers, parents, vehicle rental companies, and other vehicle owners may loan a vehicle to a third party driver who will likely own a wireless device. The vehicle owners may have varying degrees of control over the driver, but may be partially or completely responsible for the results of any automobile accidents that are caused by the driver. Vehicle owners may also be unaware of the nature of a driver's usage of a wireless device in the vehicle as the vehicle owner may not be present while the vehicle is in operation. Detection systems may be installed in the vehicle, but detection systems may be unable to distinguish between driver wireless device usage and permitted wireless device usage by passengers.

SUMMARY OF THE INVENTION

In an embodiment, the disclosure includes an apparatus comprising a diagnostic unit configured to communicate with a rules engine to determine whether a transmission detected in a vehicle is classified as driver wireless device usage based on passenger data indicating whether a passenger is present in the vehicle.

In an embodiment, the disclosure also includes a system comprising a shielding unit configured to transmit a noise signal to interrupt a transmission detected in a vehicle, and a diagnostic unit configured to communicate with a rules engine to determine whether the detected transmission is classified as driver wireless device usage based on the passenger data indicating whether a passenger is present in the vehicle, and engage the shielding unit if the transmission is classified as driver wireless device usage.

In an embodiment, the disclosure also includes an apparatus comprising a rules engine configured to communicate with a diagnostic unit to determine whether a transmission detected in a vehicle is classified as driver wireless device usage based on passenger data indicating whether a passenger is present in the vehicle.

In an embodiment, the disclosure also includes a method comprising communicating with a diagnostic unit to determine whether a transmission detected in a vehicle is classified as driver wireless device usage based on passenger data indicating whether a passenger is present in the vehicle, and alerting an owner of the vehicle upon classifying the transmission as driver wireless device usage.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a vehicle mobile device detection and transmission shielding system. The system may comprise a diagnostic unit positioned in the vehicle in communication with a remote rules engine. The diagnostic unit may detect a wireless device transmission in the vehicle compartment and send transmission data to the rules engine to determine if the transmission should be classified as driver wireless device usage. The diagnostic unit may also transmit passenger data indicating the occupancy of the vehicle and/or vehicle status data indicating the current vehicle status to assist in the classification. The rules engine may exclude the transmission from classification as driver wireless usage (e.g. by classifying the transmission as nondriver wireless usage) and take no action if the transmission occurred while the vehicle engine was off, if the transmission occurred while the vehicle was stationary, and/or if the transmission occurred while the diagnostic unit was communicating with the rules engine. The diagnostic unit may receive vehicle status data from a vehicle diagnostic port and/or a global positioning system (GPS). The rules engine may also classify a transmission as nondriver wireless device usage if passenger data indicates a passenger was present in the vehicle at the time of the transmission. Passenger data may be received from the diagnostics port or other sensors such as seat belt sensors, seat pressure sensors, infrared sensors, biosensors, radio frequency identification (RFID) sensors, etc. When no exclusion exists, the rules engine may classify the transmission as driver wireless device usage. The rules engine may then transmit real time alerts to the vehicle owner, signal the diagnostic unit to sound an alert in the vehicle, and/or initiate a shielding unit. The shielding unit may transmit a noise signal to shield the transmission. The noise signal may be transmitted across a plurality of frequency bands, across a frequency band associated with an uplink of the transmission, across a frequency band associated with a downlink of the transmission, and/or at a specific frequency used during the transmission.

Figure 1:
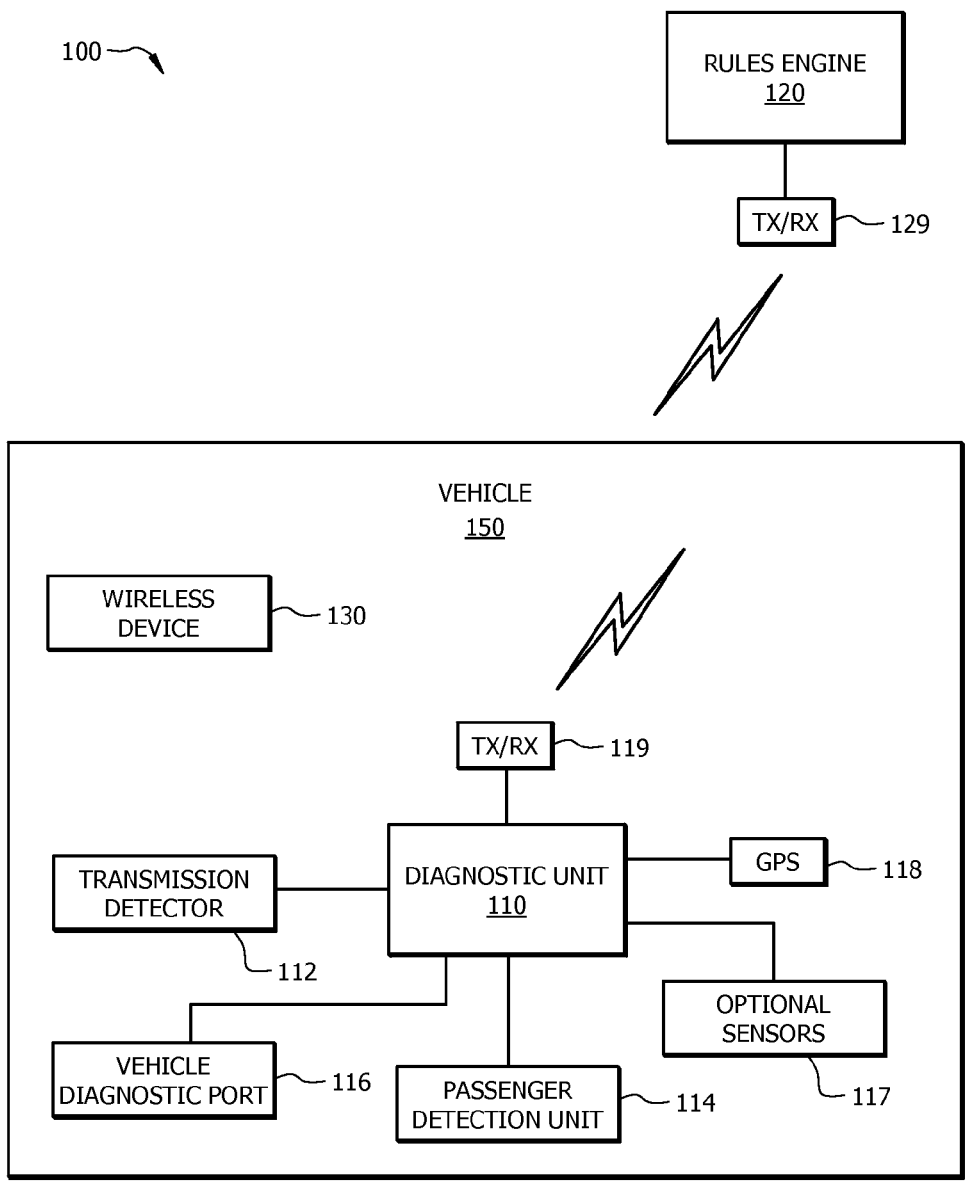
FIG. 1 is a schematic diagram of an embodiment of a vehicle wireless transmission detection system.

FIG. 1 is a schematic diagram of an embodiment of a vehicle wireless transmission detection system 100. Vehicle wireless transmission detection system 100 may comprise a diagnostic unit 110, which may be positioned in a vehicle 150. The diagnostic unit 110 may be configured to communicate with a rules engine 120 to determine whether a transmission detected in the vehicle 150 should be classified as driver wireless device usage or nondriver wireless device usage. The system 100 may further comprise a transmission detector 112 configured to detect transmissions by a wireless device 130, a vehicle diagnostic port 116 configured to output data related to the vehicle 150, a passenger detection unit 114, and a GPS receiver 118. The diagnostic unit 110 may receive data from the transmission detector 112, vehicle diagnostic port 116, passenger detection unit 114, and a GPS receiver 118 and transmit such data to the rules engine 120 via a transceiver (Tx/Rx) 119 connected to the diagnostic unit and a Tx/Rx connected to the rules engine 120.

Vehicle 150 may comprise any automobile such as a car, truck, semi-truck, etc. Most modem automobiles comprise computer systems that monitor the status of the vehicle at a specified time. Data related to vehicle status may be output to the diagnostic unit 110 via the vehicle diagnostic port 116. A vehicle diagnostic port 116 may be standard equipment on most modem vehicles (e.g. produced after 1996). As an example, a vehicle diagnostic port 116 may comprise an onboard diagnostics (OBD) port, an OBD II port, a controller area network (CAN) bus port, etc. Vehicle diagnostic port 116 may be configured to transmit vehicle status data to any connected device. Vehicle status data may include information about the vehicle's automotive systems such as an engine, transmissions, etc., information regarding the vehicle's 150 position, and/or other vehicle status information. For example, vehicle status data may include indications of whether the engine is operational or not at a specified time, whether the transmission is engaged at a specified time, whether an airbag has deployed, whether emergency, whether the vehicle's emergency brake is engaged, whether the vehicles hazard lights are engaged, etc. The vehicle diagnostic port 116 may also be configured to transmit data regarding vehicle systems that may indicate vehicle occupancy, which may be interpreted as passenger data. For example, a vehicle diagnostic port 116 may be configured to transmit data indicating whether an airbag is engaged in a passenger seat, whether a safety restraint (e.g. seat belt) is engaged, whether a pressure sensors indicates a passenger seat is occupied. The diagnostic unit 110 may be connected to the vehicle diagnostic port 116 and may receive any vehicle status data and/or passenger data as input.

The diagnostic unit 110 may also be connected to a passenger detection unit 114. The passenger detection unit 114 may be a sensor installed in the vehicle to detect passenger data. For example, a passenger detection unit 114 may comprise an infrared sensor configured to indicate if body heat is present in the passenger seat, if weight is present in the passenger seat, if a passenger seat belt is engaged, etc. As another example, the passenger detection unit 114 may comprise an RFID sensor configured to sense the presence of RFID transmitters, for example, positioned in employee badges. As another example, the passenger detection unit 114 may comprise a biometric sensor such as a retinal scanner, a fingerprint scanner, etc. A vehicle 150 door may be designed to remain locked until a passenger registers with the vehicle 150 via a biometric scan. Regardless of the embodiment, the passenger detection unit 114 may transmit passenger data to the diagnostic unit 110. The passenger data may indicate the number of occupants in the vehicle 150 at a specified time, the location of the occupants in the vehicle 150, whether a passenger is present in the vehicle 150 passenger seat, etc.

The diagnostic unit 110 may also be connected to a GPS receiver 118. The GPS receiver 118 may receive GPS signals from GPS satellites and determine the location of the vehicle 150 at a specified time. The GPS receiver 118 may transmit the vehicle location to the diagnostic unit 110 as vehicle status data. The diagnostic unit 110 may use the data from the GPS receiver 118 to determine whether the vehicle 150 is in motion at a specified time and/or the speed of the vehicle 150 at a specified time.

The diagnostic unit 110 may also be connected to a transmission detector 112, which may comprise any antenna tuned to receive and/or detect a wireless signal from wireless device 130. For example, the transmission detector 112 may be an antenna configured to detect wireless signals over bands of frequencies commonly used for wireless transmissions such as Global System for Mobile Communications (GSM) signals, Code division multiple access (CDMA) signals, Universal Mobile Telecommunications System (UMTS) signals, Institute of Electrical and Electronics Engineers' (IEEE) 802.11 standard (Wi-Fi) signals, Worldwide Interoperability for Microwave Access (WiMAX) signals, 3rd Generation Partnership Project (3GPP) signals and/or any other signals commonly used by a wireless device 130 that may be available to a vehicle driver. The transmission detector 112 may transmit any detected wireless signals (e.g. signals from wireless device 130) and/or data related to the wireless signals to the diagnostic unit 110 unit as transmission data. As an example, the transmission detector 112 may transmit the detected signal directly to the diagnostic unit 110 or may perform signal analysis on the signal and transmit the results of the analysis (e.g. data indicating a transmission occurred at a specified frequency) to the diagnostic unit 110.

The diagnostic unit 110 may communicate with the rules engine 120 via Tx/Rx 119. Tx/Rx 119 may comprise a transmitter for generating transmission signals, a receiver for receiving transmission signals, and at least one antenna for sending signals to and/or receiving signals from the rules engine 120 via Tx/Rx 129 (which may be similar to Tx/Rx 119). Tx/Rx 119 may be configured to employ any wireless transmission technology that is also supported by Tx/Rx 129, for example, GSM. The diagnostic unit 110 may maintain constant communication with the rules engine 120 or may contact the rules engine 120 only upon the occurrence of a predetermined event. For example, the diagnostic unit 110 may contact the rules engine 120 upon engine start, upon determining the vehicle 150 has left a certain geographic region (e.g. by analyzing GPS 118 data), upon determining the vehicle is in motion, upon receiving transmission data from the transmission detector 112, or upon any other event that may be of interest to the vehicle owner 150 and/or the system 100. The diagnostic unit 110 may perform rudimentary signal processing on the transmission data from the transmission detector 112. For example, the diagnostic unit 110 may disregard detected signals if they appear to be too weak to come from inside the vehicle 150 and/or are detected outside an expected frequency band (e.g. background noise signals and/or signals not typically associated with a wireless device 130). The diagnostic unit 110 may send any information to the rules engine 120 that may be of interest, such as transmission data, passenger data, vehicle status data, etc. The diagnostic unit 110 may send all relevant data during each communication or may send only data that has changed since the last communication between the diagnostic unit 110 and the rules engine 120. In addition or in the alternative, the diagnostic unit 110 may send data to the rules engine 120 upon request.

The rules engine 120 may be located remotely from vehicle 150 and may serve a plurality of diagnostic units 110. The rules engine 120 may communicate with the diagnostic unit 120 via Tx/Rx 129 which may be any device configured to communicate with Tx/Rx 119, for example, a base station. The rules engine 120 may be configured to receive transmission data, passenger data, and/or vehicle status data from the diagnostic unit 110 and classify a detected transmission as driver wireless device usage or nondriver wireless device usage. The rules engine 120 may classify any transmissions as nondriver wireless device usage based on passenger data, for example, if a passenger is present in the vehicle, if a passenger is present in the passenger seat, if the occupancy of the vehicle 150 is greater than one, etc. The rules engine 120 may also classify any transmissions as nondriver wireless device usage based on vehicle status data, for example, if the vehicle 150 engine is off, if the vehicle 150 is stationary, etc. The rules engine 120 may also classify any transmissions as nondriver wireless device usage by comparing the transmission data to the timing of communications between the rules engine 120 and the diagnostic unit 110 (e.g. to filter out detected system 100 communications). If a detected transmission cannot be classified as nondriver wireless device usage, the transmission may be classified as driver wireless device usage.

Upon classifying a transmission as driver wireless device usage, the rules engine 120 may notify the vehicle 150 owner, for example, via email, text message, phone, mail, or any other contact method. The rules engine 120 may cause a notification to be sent immediately or may cause the occurrence of the driver wireless device usage to be stored so that a report of all occurrences of driver wireless device usage may be sent to the vehicle 150 owner at once. For example, an owner of a fleet of vehicles 150 may receive a monthly report of driver wireless device usage comprising the date, time, the vehicle 150, type of transmission detected, etc. The rules engine 120 may also send commands to the diagnostic unit 120 in response to the classification. For example, the diagnostic unit 110 may comprise an alarm, a light, or other alert system, and the rules engine 120 may send a command to the diagnostic unit 110 to engage the alert system to warn the vehicle driver that driver wireless device usage has been detected. As another example, the diagnostic unit 110 may comprise an audio and/or video recorder which may be positioned to record the driver's seat of the vehicle 150. Upon classifying a transmission as driver wireless device usage, the rules engine 120 may send a command to engage the recorder(s) and return any recording to the rules engine 120 for storage and/or notification to the vehicle 150 owner. As such, the diagnostic unit 110 and the rules engine 120 may communicate to classify wireless transmissions, report improper wireless device use by a vehicle 150 driver, and/or discourage continued improper wireless device via alarm systems.

The diagnostic unit 110 may also be connected to one or more optional sensors 117. The optional sensors 117 may provide additional vehicle status data, transmission data, and/or passenger data that may provide context for a transmission and may be of use in classifying a transmission as nondriver wireless device usage. For example, optional sensors 117 may comprise an accelerometer configured to measure a vehicle crash and/or changes in engine vibration. Accelerometer measurements may be sent to the rules engine 120 as vehicle status data. In the event of a crash or unusual engine activity (e.g. as measured by optional sensors 117 and/or by the vehicle diagnostic port 116), wireless transmissions may be deemed acceptable under the circumstances and may be classified as nondriver wireless device usage. As another example, the optional sensors 117 may comprise a sensor configured to detect hands free wireless signals, such as a detector configured to detect Bluetooth™ communications. Wireless device usage may be deemed acceptable when a driver is using a wireless device in hands free mode. As such, the rules engine 120 may classify a transmission as nondriver wireless device usage if the transmission corresponds to a detected hands free signal received from an optional sensor 117 via the diagnostics unit 110.

Rules engine 120 may be positioned outside of the vehicle 150 to allow the rules engine 120 to service a plurality of diagnostic units 110. Employing a centralized rules engine 120 may also allow updates to rules engine 120 rules to easily propagate over a system 100 comprising a plurality of vehicles 150 and/or diagnostic units 110. Employing a centralized rules engine 120 may also reduce the complexity of the diagnostic unit 110, which may reduce costs on a per vehicle 150 basis. However, the rules engine 120 may also be positioned in the vehicle 150 and/or in the diagnostic unit 110. In such case, the rules engine 120 may be dedicated to a particular diagnostic unit 110 and/or vehicle 150 and updated manually and/or remotely via Tx/Rx 119 and/or 129.

Figure 2:
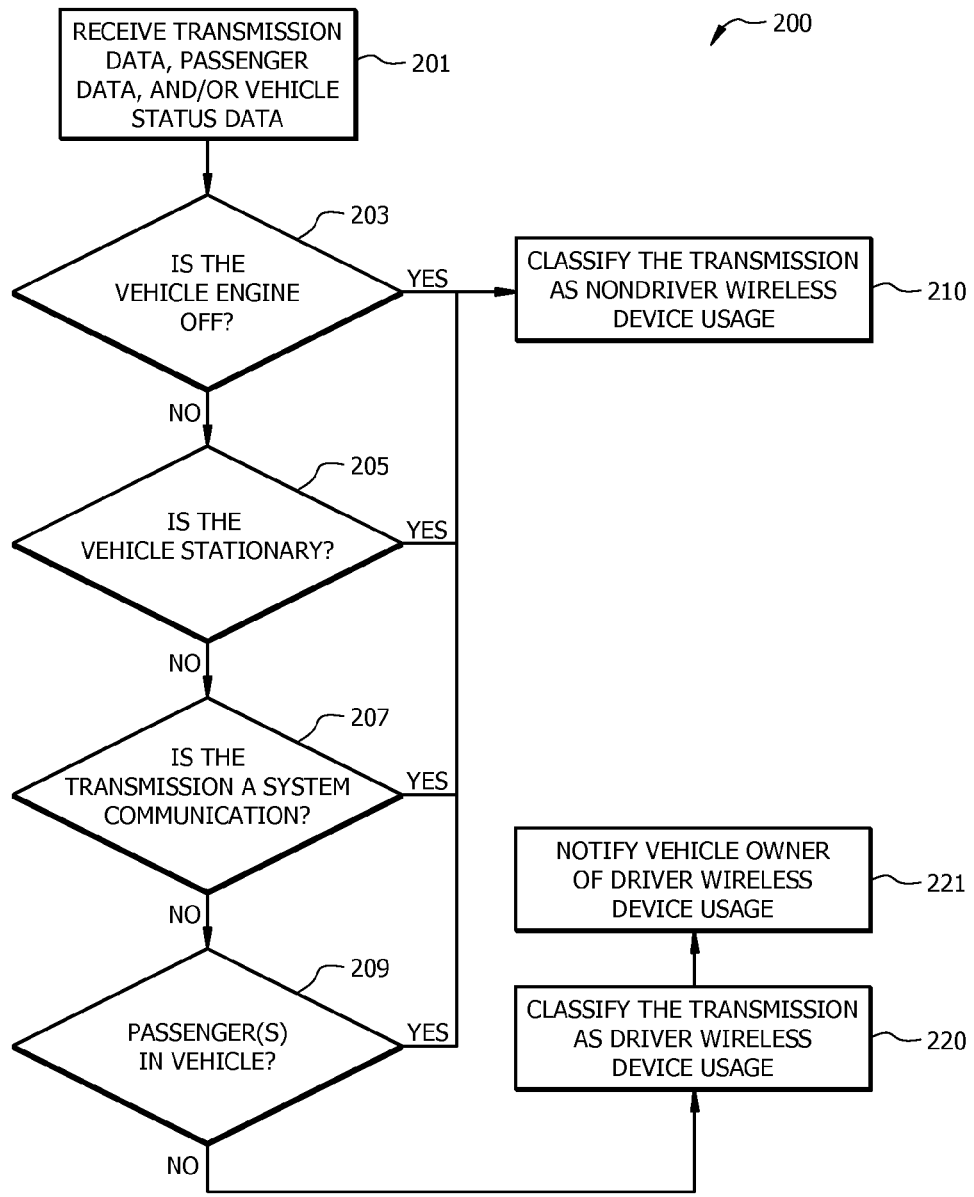
FIG. 2 is a flowchart of an embodiment of a wireless transmission classification method.

FIG. 2 is a flowchart of an embodiment of a wireless transmission classification method 200, which may be implemented on a rules engine 120, diagnostic unit 110 and/or combinations thereof. At step 201, method 200 may receive transmission data, passenger data, and/or vehicle status data and proceed to step 203. The transmission data may comprise data related to a detected wireless transmission, the passenger data may comprise data related to the occupancy of a vehicle such as vehicle 150, and the vehicle status data may comprise information regarding the status of the vehicle's 150 systems, vehicle position, etc. The method 200 may proceed to step 210 if the engine is off (e.g. based on vehicle status data from a vehicle diagnostic port 116) and classify the detected transmission as nondriver wireless device usage. The method 200 may proceed to step 205 if the engine is not off (e.g. in operation) and determine if the vehicle is stationary. The method 200 may proceed to step 210 if the vehicle is stationary (e.g. based on vehicle status data from a GPS receiver 118) or proceed to step 207 if the vehicle is not stationary (e.g. in motion). At step 207, the method may filter out system communications (e.g. communications between a rules engine 120 and a diagnostic unit 110.) If the detected transmission occurred at about the same time as a known system communication, the detected transmission may be the system communication. The method may proceed to step 210 if the transmission is a system communication and step 209 if the transmission is not a system communication. At step 209, the method may review the passenger data (e.g. from vehicle diagnostic port 116, passenger detection unit 114, etc.) and determine whether there are passengers in the vehicle. For example, the method 200 may determine if there is a passenger in the vehicle passenger seat. The method may proceed to step 210 if a passenger is present. As such, the method 200 may assume any wireless transmissions made when a passenger is present are made by the passenger and not by the driver and may classify such transmissions as nondriver wireless device usage. If the detected transmission received at step 201 cannot be classified as nondriver wireless device usage at step 210 based on the determinations made at steps 203, 205, 207, and/or 209, the method may proceed to step 220 and classify the detected transmission as driver wireless device usage. Once the transmission is classified as driver wireless device usage at step 220, the method may notify the vehicle owner of the driver wireless device usage at step 221. As discussed above, the method may also save and/or aggregate the driver wireless device usage for a report and/or alert the driver via an alarm.

Figure 3:
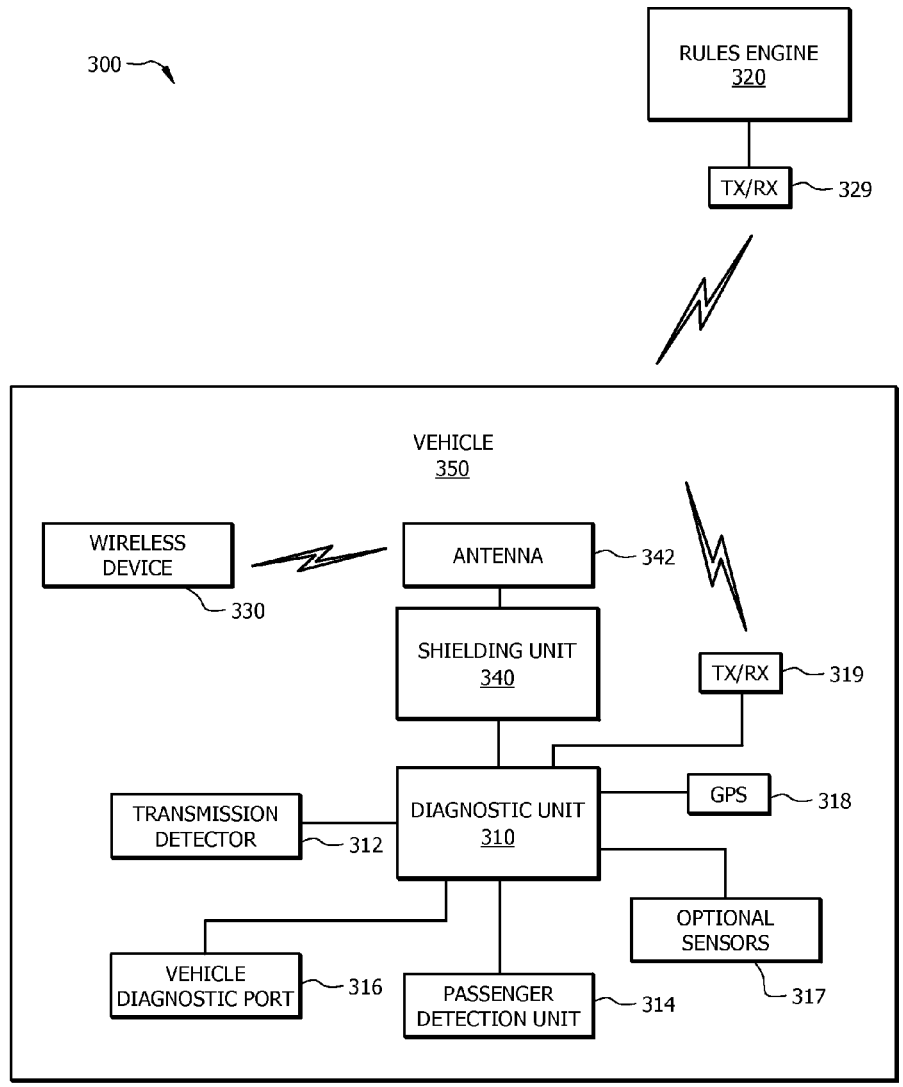
FIG. 3 is a schematic diagram of an embodiment of an in-vehicle wireless transmission detection and shielding system.

FIG. 3 is a schematic diagram of an embodiment of an in-vehicle wireless transmission detection and shielding system 300. System 300 may comprise a vehicle 350, a diagnostic unit 310, a Tx/Rx 319, a transmission detector 312, a vehicle diagnostic port 316, a passenger detection unit 314, a GPS receiver 318, optional sensors 317, a rules engine 320, and a Tx/Rx 329, which may be substantially similar to vehicle 150, a diagnostic unit 110, a Tx/Rx 119, a transmission detector 112, a vehicle diagnostic port 116, a passenger detection unit 114, a GPS receiver 118, optional sensors 117, a rules engine 120, and a Tx/Rx 129 and may be used to classify wireless transmissions by wireless device 330, which may be substantially similar to wireless device 130. System 300 may further comprise a shielding unit 340 connected to the diagnostic unit 310. Upon classifying a detected transmission as driver wireless device usage, the rules engine 320 may command the diagnostic unit 310 to engage the shielding unit 340. Shielding unit 340 may generate a noise signal to shield the detected transmission and transmit the noise signal in the vehicle using antenna 342. Shielding as used herein may mean to interrupt an ongoing transmission and/or prevent the initiation of a transmission (e.g. by interrupting a communications handshake.) For example, the noise signal may be transmitted across all commonly used frequency bands to shield all transmissions. The noise signal may be limited to an electric field strength of about 200 microvolts per meter or less (e.g. as measured at a distance of three meters) and/or limited to an electric field strength of about 500 microvolts or less (e.g. as measured at a distance of three meters), which may shield the transmission without significantly affecting transmissions of other wireless device users positioned outside of the vehicle 350. As a further example, the field strength limit of 200 microvolts may be employed when shielding signals in frequency bands of about 700 MHz and about 850 MHz and the 500 microvolts field strength limit may be employed when shielding signals in frequency bands of about 1900 MHz and about 2100 MHz. The noise signal transmission may be limited to a range of about 0.5 seconds to about 3 seconds, which may be sufficient time to shield an ongoing transmission.

As another example, the system 300 may shield signals in a targeted manner to reduce the possibility of affecting transmissions of other wireless device users positioned outside of the vehicle 350. During a communication between a wireless device 330 and an associated tower, the wireless device 330 may transmit a signal to the tower which may be referred to as an uplink and may receive a signal which may be referred to as a downlink. The rules engine 330 may determine the frequency of the transmission uplink based on the transmission data received from the diagnostic unit 310 as measured by the transmission detector 312. The rules engine 330 may command the diagnostic unit 310 to engage the shielding unit 340 to transmit a noise signal of the same frequency as the uplink signal and/or a noise signal across a frequency band that encompasses the frequency of the uplink signal.

As another example, the rules engine 330 may be aware that an uplink frequency band is associated with one or a small number of downlink frequency bands based on the wireless networks commonly deployed in a specified geographic region. The rules engine 330 may command the diagnostic unit 310 to engage the shielding unit 340 to transmit a noise signal across the downlink frequency band(s) associated with the uplink frequency band that comprises the frequency of the uplink transmission as detected by the transmission detector 312. As a specific example, in the United States, GSM and/or CDMA systems may employ a frequency band ranging from about 824 megahertz (MHz) to about 849 MHz as an uplink frequency band and a frequency band ranging from about 869 MHz to about 894 MHz as a downlink frequency band. As another specific example, GSM and/or CDMA systems may employ a frequency band ranging from about 1850 MHz to about 1910 MHz as an uplink frequency band and a frequency band ranging from about 1930 MHz to about 1990 MHz as a downlink frequency band. If a detected transmission comprises a frequency between about 824 MHz and about 849 MHz, the rules engine 330 may command the diagnostic unit 310 to engage the shielding unit 340 to transmit a noise signal across the frequency band ranging from about 869 MHz to about 894 MHz. Likewise, if a detected transmission comprises a frequency between about 1850 MHz and 1910 MHz, the rules engine 330 may command the diagnostic unit 310 to engage the shielding unit 340 to transmit a noise signal across the frequency band ranging from about 1930 MHz to about 1990 MHz.

As another example, the rules engine 320, diagnostic unit 310, and/or the shielding unit 340 may exclude a transmission from classification as driver wireless device usage and/or override an instruction to shield a signal to allow a driver to access emergency services (e.g. emergency calls to a police station.) For example, the rules engine 320, diagnostic unit 310, and/or the shielding unit 340 may determine to reclassify a transmission and/or override a shielding instruction in the event of a crash (e.g. vehicle 350 hazard lights are on, vehicle 350 airbags are deployed, optional sensor 317 detects shock consistent with a crash, vehicle 350 emergency brake active, etc. As such, shielding may be discontinued automatically and/or by action of the driver to allow for communication with emergency services.

Figure 4:
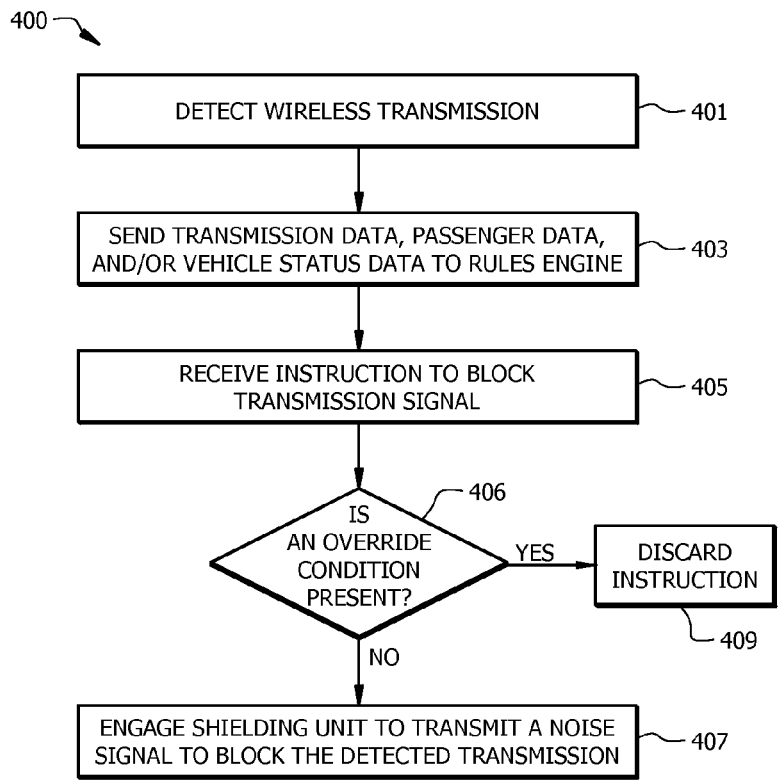
FIG. 4 is a flowchart of an embodiment of a wireless transmission shielding method.

FIG. 4 is a flowchart of an embodiment of a wireless transmission shielding method 400, which may be implemented by a rules engine 320, diagnostic unit 310 and/or a shielding unit 340. At step 401, the method 400 may detect a wireless transmission, for example, an uplink transmission measured by transmission detector 312. At step 403, the method 400 may send transmission data, passenger data, and/or vehicle status data to a rules engine. The transmission data may comprise data indicating the frequency and/or frequency band of the transmission (e.g. the uplink frequency and/or uplink frequency band). At step 405, the method 400 may receive instructions to shield the detected transmission signal. The instructions may comprise an indication of the frequencies and/or frequency bands to be shielded. At step 406, the method may determine if there is an override condition present (e.g. hazard lights engaged, airbags deployed, crash detected, etc.) The method 400 may proceed to step 409 and discard the instruction to shield the detected transmission if an override condition is present. The method 400 may proceed to step 407 if no override condition is present. At step 407, the method 400 may engage a shielding unit (e.g. shielding unit 340) to transmit a noise signal to shield the detected transmission. Depending on the embodiment, the noise signal may be transmitted across substantially all frequency bands used by wireless devices, a detected transmission's uplink frequency, a detected transmission's uplink frequency band, and/or at least one downlink frequency band associated with the detected transmission's uplink frequency and/or frequency band.

Figure 5:
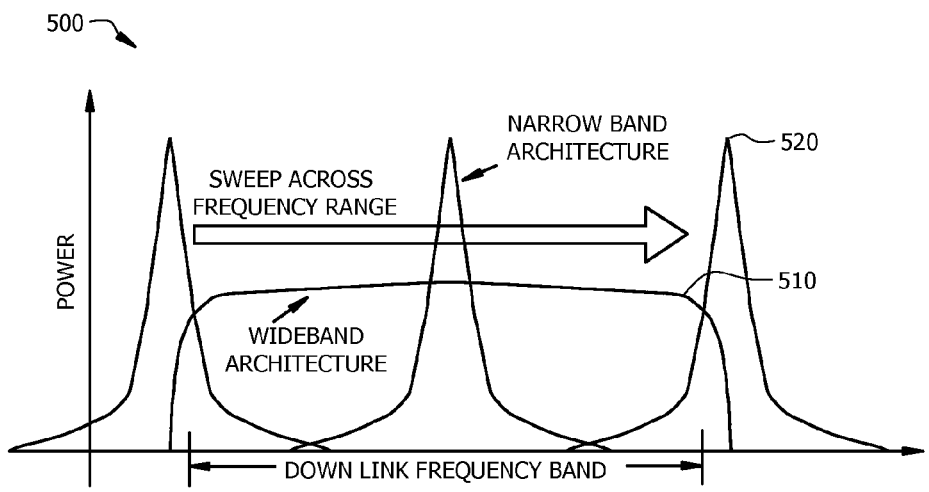
FIG. 5 is a diagram of an embodiment of the power usage of a wideband noise signal verses a narrow band noise signal sweep over a frequency band.

FIG. 5 is a diagram 500 of an embodiment of the power usage of a wideband noise signal 510 versus a narrow band noise signal sweep 520 over a frequency band, for example, as transmitted by shielding unit 340. As shown in FIG. 5, signal sweep 520 may comprise a plurality of pulses, which may shield a frequency band. Wideband noise signal 510 may also shield substantially all of a frequency band of interest, but may use less power than signal sweep 520. Wideband noise signal 510 may also employ a relatively constant maximum power level across the frequency band, which may prevent the transmission of high power level spikes that may unintentionally interfere with surrounding devices. Depending on the embodiment, shielding unit 340 may employ wideband noise signal 510, narrow band noise signal sweep 520, or combinations thereof.

Figure 6:
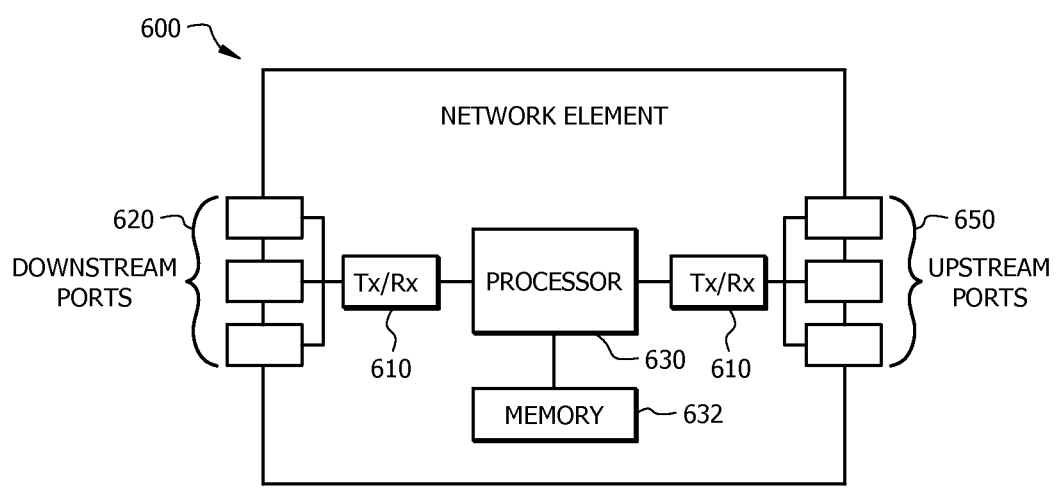
FIG. 6 is a schematic diagram of an embodiment of a network element (NE.)

FIG. 6 is a schematic diagram of an embodiment of a NE 600, which may function as a node in network 100 and/or 300, for example, a diagnostic unit 110/310, a rules engine 120/320, and/or a shielding unit 340. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 600. For instance, the features/methods in the disclosure may be implemented using hardware, firmware, and/or software installed to run on hardware. The NE 600 may be any device that transports frames through a network. As shown in FIG. 6, the NE 600 may comprise transceivers (Tx/Rx) 610, which may be transmitters, a receiver, or combinations thereof. A Tx/Rx 610 may be coupled to plurality of downstream ports 620 for transmitting and/or receiving frames from other nodes, a Tx/Rx 610 coupled to plurality of upstream ports 650 for transmitting and/or receiving frames from other nodes and/or antennas, and a processor 630 coupled to the Tx/Rxs 610 to process the frames and/or determine which nodes to send frames to. The processor 630 may comprise one or more multi-core processors and/or memory devices 632, which may function as data stores. The downstream ports 620 and/or upstream ports 650 may contain electrical and/or optical transmitting and/or receiving components.

It is understood that by programming and/or loading executable instructions onto the NE 600, at least one of the processor 630, memory 632, and/or Tx/Rx 610 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example, in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A system for reporting wireless device usage in a vehicle, comprising: a transmission detector comprising an antenna suitable for detection of a wireless signal, wherein the wireless signal is selected from the group consisting of a GSM signal, a CDMA signal, a UMTS signal, a WiFi signal, a WiMAX signal, and a 3GPP signal, wherein the transmission detector is configured to detect a first wireless signal from the wireless device and a second wireless signal, and wherein the first wireless signal is configured to communicate with a cellular network;
 a diagnostic unit that is distinct from the wireless device and co-located with the vehicle and that is communicatively coupled to a global satellite positioning system receiver and to the transmission detector, wherein the diagnostic unit comprises a signal processor comprising encoded instructions for signal processing of data received from the transmission detector,
 wherein the diagnostic unit is configured to receive (a) global positioning data from the global satellite positioning system receiver, and (b) first wireless signal data and second wireless signal data from the transmission detector, and
 wherein the encoded instructions of the signal processor perform signal processing to differentiate the first wireless signal data from the second wireless signal data and permit transmission of the first wireless signal data using a first transmitter;
 a rule-based evaluation system hosted remotely from the vehicle, and that is communicatively coupled to the diagnostic unit, wherein the rule-based evaluation system comprises second encoded instructions to classify the first wireless signal based on the first wireless signal data transmitted from the diagnostic unit and the global positioning data from the diagnostic unit and comparison of the first wireless signal data to a timing of communication between the diagnostic unit and the rule-based evaluation system, and wherein the rule-based evaluation system is configured to transmit a command to the diagnostic unit based upon the classification of the first wireless signal; and
 wherein the diagnostic unit is configured to communicate with a shielding unit.

2. The system of claim 1, wherein the rules engine is configured to transmit a command to the diagnostics unit when the classification indicates that a driver is using a wireless device in a moving vehicle.

3. The system of claim 1, wherein the diagnostic unit comprises an alert system.

4. The system of claim 3, wherein the alert system provides an alarm to a driver in response to the command from the rules engine.

5. The system of claim 1, wherein the second wireless signal does not originate with the wireless device.

6. The system of claim 1, wherein the rules engine configures an output device to provide a notification.

7. The system of claim 6, wherein the notification is provided to a vehicle owner.

8. The system of claim 6, wherein the notification is selected from the group consisting of an email, text message, telephone message, or mail message.

9. The system of claim 1 wherein the shielding unit is configured to transmit a noise signal on at least one cellular frequency associated with use of the wireless device on receiving a command from the diagnostic unit.

10. The system of claim 9 wherein the noise signal is transmitted as a plurality of narrow band signals.

11. The system of claim 10, wherein at least one of the plurality of narrow band signals comprises an uplink frequency.

12. The system of claim 10, wherein at least one of the plurality of narrow band signals comprises a downlink frequency.

13. The system of claim 10, wherein the plurality of narrow band signals comprises both an uplink frequency and a downlink frequency.

14. The system of claim 9, wherein the noise signal is transmitted as a single wide band signal encompassing a plurality of cellular frequencies.

15. The system of claim 14, wherein the wide band signal comprises an uplink frequency.

16. The system of claim 14, wherein the wide band signal comprises a downlink frequency.

17. The system of claim 14, wherein the wide band signal comprises both an uplink frequency and a downlink frequency.

18. A method for reporting wireless device usage in a vehicle comprising: utilizing a transmission detector comprising an antenna suitable for detection of a wireless signal, wherein the wireless signal is selected from the group consisting of a GSM signal, a CDMA signal, a UMTS signal, a WiFi signal, a WiMAX signal, and a 3GPP signal to detect a first wireless signal from the wireless device and a second wireless signal, wherein the first wireless signal is configured to communicate with a cellular network;
 transmitting, from the transmission detector, first wireless signal data and second wireless signal data from the transmission detector to a diagnostic unit that is distinct from the wireless device and collocated with the vehicle, wherein the diagnostic unit comprises a signal processor comprising encoded instructions for signal processing of data received from the transmission detector;
 transmitting global positioning data from a global satellite positioning system receiver to the diagnostic unit;
 performing, utilizing the encoded instructions of the signal processor, signal processing, by the diagnostic unit, to differentiate the first wireless signal data from the second wireless signal data;
 selectively transmitting, from the diagnostic unit, the first wireless signal data;
 receiving, by a rule-based evaluation system hosted-remotely from the vehicle, the first wireless signal data and the global positioning data from the diagnostic unit;
 classifying, by the rule-based evaluation system, the first wireless signal using the first wireless signal data and the global positioning data, based on the first wireless signal data transmitted from the diagnostic unit and the global positioning data from the diagnostic unit and comparison of the first wireless signal data to a timing of communication between the diagnostic unit and the rule-based evaluation system;

transmitting, by the rule-based evaluation system, a command to the diagnostic unit based upon the classification of the first wireless signal; and transmitting a noise signal from a shielding unit that is communicatively coupled to the diagnostic unit.

19. The method of claim 18, wherein the rules engine transmits a command to the diagnostics unit when the classification indicates that a wireless device is transmitting from a moving vehicle.

20. The method of claim 18, wherein the diagnostic unit further comprises an alert system.

21. The method of claim 20, wherein the alert system provides an alarm to a driver in response to the command from the rules engine.

22. The method of claim 18, wherein the second wireless signal originates external to the wireless device.

23. The method of claim 18, wherein the rules engine configures an output device to provide a notification.

24. The method of claim 23, wherein the notification is provided to vehicle owner.

25. The method of claim 23, wherein the notification is selected from the group consisting of an email, text message, telephone message, or mail message.

26. The method of claim 25, wherein the noise signal comprises a plurality of narrow band signals at cellular frequencies associated with use of the wireless device.

27. The system of claim 18 wherein the noise signal is transmitted as a plurality of narrow band signals.

28. The method of claim 27, wherein at least one of the plurality of narrow band signals comprises an uplink frequency.

29. The method of claim 27, wherein at least one of the plurality of narrow band signals comprises a downlink frequency.

30. The method of claim 27, wherein the plurality of narrow band signals comprises both an uplink frequency and a downlink frequency.

31. The method of claim 27, wherein the noise signal comprises a single broad band signal encompassing a plurality of cellular frequencies associated with use of the wireless device.

32. The method of claim 18, wherein the wide band signal comprises an uplink frequency.

33. The method of claim 32, wherein the wide band signal comprises a downlink frequency.

34. The method of claim 32, wherein the wide band signal comprises both an uplink frequency and a downlink frequency.

* * * * *